United States Patent
Baer

[15] 3,663,938
[45] May 16, 1972

[54] SYNCHRONOUS ORBIT BATTERY CYCLER

[72] Inventor: David A. Baer, Silver Spring, Md.
[73] Assignee: The United States of America as represented by the Administrator of the National Aeronautics and Space Administration
[22] Filed: May 3, 1971
[21] Appl. No.: 139,528

[52] U.S. Cl..............................320/48, 235/92 T, 307/141.8, 324/29.5
[51] Int. Cl......................H02j 7/00, G06f 7/38, G01n 27/42
[58] Field of Search...................320/27, 48; 307/141, 141.4, 307/141.8; 324/29.5, 76; 235/151.31, 92 T, 92 PL, 92 CC, 104, 92 TF, 92 MT

[56] References Cited

UNITED STATES PATENTS

| 3,030,462 | 4/1962 | Wandrey | 307/141.8 X |
| 3,349,390 | 10/1967 | Glassman | 235/92 PL |
| 3,586,835 | 6/1971 | Foeh, Jr. | 235/92 CC |

OTHER PUBLICATIONS

National Bureau of Standards, Technical News Bulletin No. 356, Dec., 1946 pp. 89, 90, " Cycle Testing Laboratory for Aircraft Batteries"

Primary Examiner—J. D. Miller
Assistant Examiner—Robert J. Hickey
Attorney—R. F. Kempf, Earl Levy and John R. Manning

[57] ABSTRACT

A device is activated into first and second different states for differing time intervals in response to periodic pulses from a first clock pulse source which increments a first counter. A second counter is reset by each pulse of the first clock source and is incremented by pulses from a second clock source having a frequency greater than the frequency of the pulses derived from the first clock source. In response to the counts of the two counters being the same, a comparator derives an output response. The device is activated to the first state during the time interval between pulses from the first clock source and the output response and is activated into the second state for a time interval between the derivation of the output response and the next succeeding pulse from the first clock source. In one particular use, the system is employed for alternately connecting a battery to a battery charger and load for simulating the charging and discharging characteristics, respectively, of the battery as if it were located on a synchronous artificial earth satellite.

7 Claims, 2 Drawing Figures

INVENTOR;
DAVID A. BAER

BY

Carl Levy
ATTORNEYS

SYNCHRONOUS ORBIT BATTERY CYCLER

ORIGIN OF THE INVENTION

The invention described herein was made by an employee of the United States Government and may be manufactured and used by or for the Government for governmental purposes without the payment of any royalties thereon or therefor.

FIELD OF INVENTION

The present invention relates generally to apparatus for activating a device to first and second states for differing time intervals and more particularly to such an apparatus that includes a pair of counters driven at different frequencies and which activate the device into different states in response to a predetermined condition existing between the counts of the counters.

BACKGROUND OF THE INVENTION

Apparatus and techniques which are known for periodically activating a device into first and second different states for differing time intervals have generally included automatic mechanical timers and cams or manual operations. The mechanical timer is beset with difficulties because of problems involved in adjusting the position of the cams. In addition, for many applications the number of times the device is periodically activated is relatively great, for example twenty or more, so that there is a necessity to employ an extremely large number of cams. The use of a larger number of cams, however, is not in many instances practical because of the expense and cumbersomeness thereof. The technique for manually activating a device for different time intervals involves an operator continuously monitoring a clock, following a schedule and activating a switch in accordance with the schedule for a particular time on the clock. This technique demands the attention of an operator and has been found to be quite susceptible to human error.

SUMMARY OF THE INVENTION

In accordance with the present invention, a device is periodically activated into first and second states for differing time intervals during each of a large number of periods by providing a pair of counters which are driven at widely disparate frequencies. Each time the first one of the pair of counters is incremented by a first clock pulse source driving it, the second counter, which is incremented at a much higher frequency than the first counter by a second clock pulse source, is reset. In response to a predetermined condition between the counters existing (the counts thereof being the same) an output response is applied to the device to drive it into a first state; the device having been previously in a second state for the time interval between incrementing of the first counter and the derivation of the output response. The device remains in the first state until the first counter is again incremented by a second pulse from the first clock source, at which time the device is driven back to the second state, where it remains until the next output response is derived. The next output response occurs a different time interval after the derivation of the second pulse from the first clock source relative to the time interval between the first output response and the first pulse from the first clock source. Operation continues continually in this manner until a predetermined number of periodic pulses are derived or indefinitely, depending upon the type of device.

For one mode of operation, the increments between adjacent intervals, while the device is activated to a first condition, are linearly related. In certain applications, however, it is desirable to have the increments between adjacent intervals, while the load is activated to the first condition, different for a first group of periods relative to a second group of periods. With such a technique, nonlinear relationships between the number of periods and activation times of the load during each period are piecemeal approximated by a number of straight line segments.

A further feature of the invention enables the first counter to have a maximum capacity less than the total number of periods it is required to count. To this end, the count of the first counter is advanced in response to each clock pulse until a first predetermined count is reached. After the first predetermined count is reached, the count of the first counter is decreased in response to each pulse from the clock source. This approach can be employed if a double valued functional relationship is to be derived between the number of periods and the duration of the time intervals within each period.

One particular use of the present invention involves activating a battery to simulate the charge and discharge characteristics of the battery while it is located on a synchronous artificial earth satellite and is charged by a solar array positioned on the satellite. This simulation is important to enable the characteristics of batteries adapted to be mounted on synchronous artificial earth satellites to be tested with a high degree of reliability. In such an application, the spacecraft battery is charged by the solar array responsive to sunlight for differing time intervals over each day of a 42 day cycle. The duration of exposure time during each day of the 42 day cycle can be represented as a function similar to a parabola.

In an embodiment of the present invention, the parabolic like function is approximated by four straight line segments having differing slopes representing the number of days in the cycle versus the duration of solar array exposure to the sun during each day. The four slopes are grouped in two pairs so that the two slopes of each pair have the same magnitude but different polarities or direction. The different slopes are simulated by driving the second counter with pulses having differing frequencies.

It is, accordingly, an object of the present invention to provide a new and improved apparatus for periodically activating a device into a pair of different states for differing time intervals.

Another object of the invention is to provide a new and improved apparatus for controlling the charging and discharging of a battery to simulate the characteristics of a battery maintained on a synchronous artificial earth satellite.

Another object of the invention is to provide a new and improved system for deriving a sequence of equal length time periods, each of which includes two segments, wherein the segments of adjacent intervals are always different from each other.

Yet another object of the invention is to provide a new and improved apparatus for deriving a functional relationship including a number of straight line segments that approximate a curved function.

Still another object of the invention is to provide a new and improved apparatus for deriving a double valued functional relationship with respect to time.

The above and still further objects, features and advantages of the present invention will become apparent upon consideration of the following detailed description of one specific embodiment thereof, especially when taken in conjunction with the accompanying drawings.

DETAILED DESCRIPTION OF THE DRAWING

The specific embodiment is described in conjunction with a system for simulating the charging and discharging characteristics of a battery as if it were on an artificial earth satellite in synchronous orbit. It is to be understood, however, that many of the principles are also applicable in conjunction with other types of loads, such as electric lamp displays, if suitable changes in the frequencies of certain of the sources are made.

Figure 1:
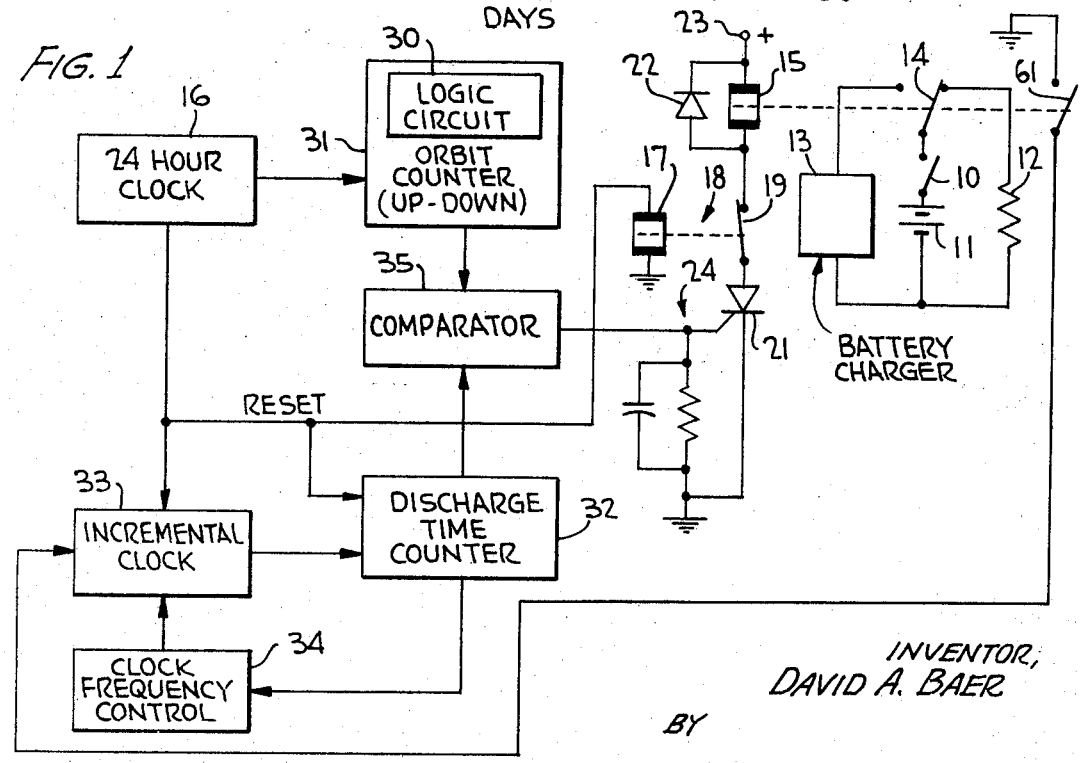
FIG. 1 is a block diagram of a preferred embodiment of the present invention.

Reference is now made specifically to FIG. 1 of the drawings wherein there is illustrated a block diagram of a preferred embodiment of the present invention particularly adapted for use in controlling the duration of charge and discharge intervals of battery 11, which is selectively connected to load resistor 12 and to battery charger 13, e.g. a solar array simulator, through double pole single throw contacts 14, the position of which is determined by the presence or absence of current in relay coil 15, i.e., after normally open circuited start switch contact 10 has been previously closed. Coil 15 is periodically activated, at a rate of once per day, so that battery 11 is connected with load resistor 12.

To this end, clock source 16, which derives periodically an output pulse once every 24 hours, is provided. Clock source 16 includes conventional elements (not shown), such as a switch controlled by a timing motor, for deriving an output pulse having a repetition rate of one time per day. The output pulse of clock source 16 is applied to the coil 17 of relay 18 that includes normally closed contact 19. Contact 19 is connected in the anode circuit of silicon controlled rectifier 21 and is series connected with coil 15 which is shunted by protective diode 22. Relay 15 is responsive to d.c. current at terminal 23 as long as contact 19 remains closed and silicon controlled rectifier 21 is fired. Firing of silicon controlled rectifier 21 is in response to a short duration, positive pulse on lead 24, which pulse is supplied to the gate electrode of silicon controlled rectifier 21.

In the system being described, during successive 24 hour periods, the time interval between the derivation of an output pulse by clock source 16 and the occurrence of a pulse on lead 24 changes. Further, during a first group of 24 hour intervals, the change in the time interval between each pulse on lead 24 relative to the derivation time of a pulse by clock source 16 is the same between adjacent 24 hour periods, and during a second group of 24 hours periods, the change in the time interval is different from that of the first group.

To derive the pulses on lead 24 in the manner stated, a pair of five-stage counters 31 and 32 is provided. Counter 31 indicates the number of elapsed days in a simulated cycle and is therefore referred to as an orbit counter. To this end, counter 31 is connected to clock source 16 so that it is incremented in one direction or the other each time a pulse is derived from clock source 16. To enable a five-stage counter, having a maximum count of 32, to be employed for synthesizing a double valued function for more than 32 counts of clock 16, counter 31 is provided with logic circuitry 30 of a well known type enabling the count thereof to be advanced or decreased in response to each pulse from source 16. The logic circuitry is connected in counter 31 so that in response to a predetermined count being attained therein, while the counter is being advanced, the count of the counter is thereafter decreased until a second predetermined count is reached. Thereby, counter 31 may be advanced and decreased between predetermined maximum and minimum counts.

Counter 32 controls the length of the battery discharge time during each day and is referred to as a discharge time counter. Discharge time counter 32 is reset to a predetermined value, zero, once each day in response to each output pulse of clock source 16. The count in counter 32 is incremented once in response to each output pulse of clock source 33.

Clock source 33 includes a free-running pulse oscillator (not shown) that is restarted once every twenty-four hour interval in response to an output pulse derived from clock source 16. Clock source 33 is enabled in synchronism with energization and deenergization of coil 15 by providing normally open circuited contact 61 that is closed in response to energization of coil 15. With contact 61 closed, substantially ground potential is applied to a bias circuit of the oscillator in clock source 33 to deactivate the oscillator and prevent the derivation of periodic pulses thereby while battery 11 is connected to charger 13. Clock source 33 also includes means (not shown) for enabling output pulses to be derived at a pair of predetermined time intervals; one of the time intervals being every 7.5 minutes and the other time interval being once every 0.77 minutes. To control the output frequency of clock source 33, clock frequency control network 34, having an input responsive to the output of counter 32, is provided. Network 34 derives a binary output signal having a zero value in response to the count of counter 32 being less than a predetermined value. In response to counter 32 achieving or exceeding the predetermined value, a binary one signal is derived by network 34.

In response to a binary zero being derived by network 34, clock source 33 is activated so that a pulse is derived thereby once every 7.5 minutes, while the clock source 33 derives pulses at the rate of once every 0.77 minutes in response to a binary one output of network 34. By controlling the rate at which pulses are derived from clock source 33 in response to the number of counts stored in counter 32, two different counting rates are provided for incrementing counter 32. The incrementing rate for counter 32 depends on the state of the counter itself to enable synthesis of differing slopes for functional variations between the number of pulses derived from source 16 and the incremental variation between the activation times of silicon controlled rectifier 21 relative to the occurrence time of each pulse derived from source 16.

To derive pulses on lead 24 to control firing of silicon controlled rectifier 21, the counts of counters 31 and 32 are compared in comparator 35. Comparator 35 includes five exclusive OR gates, (not shown) one of which is provided for each of the five stages of counters 31 and 32. Corresponding stages of counters 31 and 32 are fed to the same exclusive OR gate of comparator 35. Output signals derived from the five exclusive OR gates are combined in a logic network (not shown) to derive an output pulse on lead 24 in response to a predetermined condition existing between the count of counters 31 and 32, which predetermined condition is equality of the counts.

Figure 2:
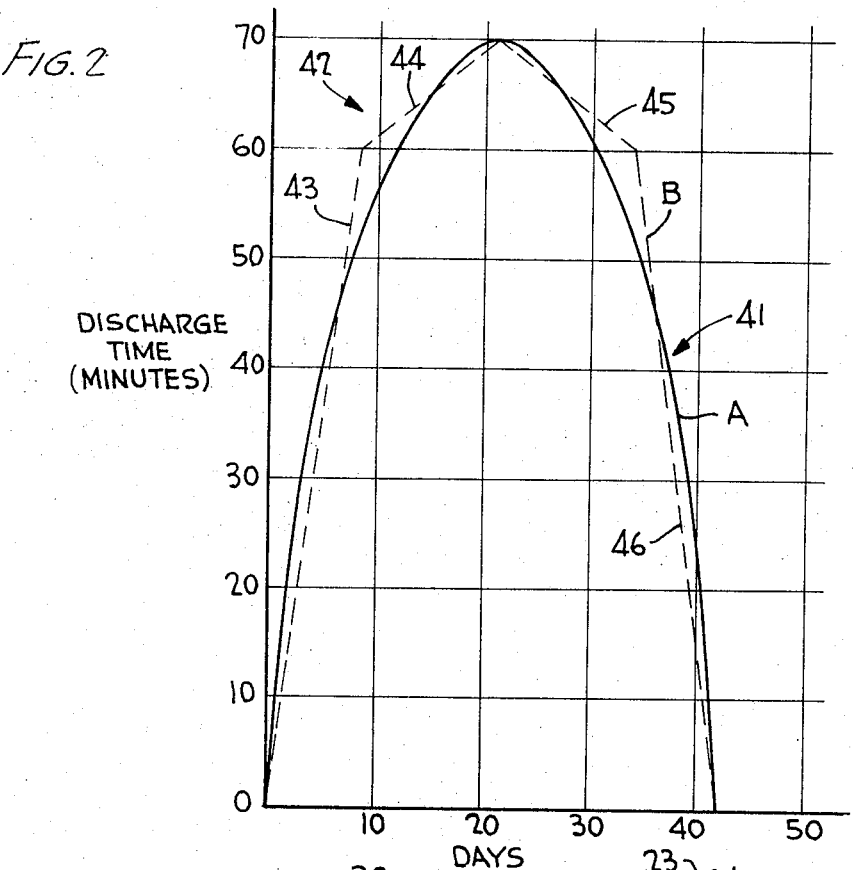
FIG. 2 is useful in describing the operation of the system of FIG. 1 in conjunction with one preferred embodiment.

To provide a more complete description of the operation of the system of FIG. 1 and the manner in which the system activates contact 14 to connect battery 11 to resistor 12 or charger 13 for simulation of the discharging or charging characteristics, respectively, of a battery on a synchronous earth satellite, reference is made to FIG. 2. In FIG. 2, discharge time, in minutes, of battery 11 through resistor 12 is plotted as a function of the number of days in a complete cycle of the movement of the satellite relative to the sun. For one particular synchronous satellite, the complete cycle requires 42 days and is represented by a parabolic type function indicated by curve 41. Curve 41 is symmetrical about the 21 day abscissa, where it has a maximum value of discharge time of 70 minutes; and curve 41 is thereby double valued, i.e., for any particular value of discharge time, other than the maximum value, there are two different days equally spaced from the pb 21 day value of symmetry.

The system of FIG. 1 simulates curve 41 with curve 42, wherein curve 42 includes straight-line segments 43, 44, 45 and 46 which, together, approximate curve 41. Straight-line segments 43 and 46 have the same slope magnitude (7.5 minutes per day) but are oppositely directed; straight-line segments 44 and 45 have the same slope magnitude (0.77 minutes per day) and are also oppositely directed. The magnitudes of curves 41 and 42 are identical at the beginning, midpoint, and end of each cycle to attain a close approximation of the actual characteristics of curve 41. In particular, at the beginning and end of the cycle, the discharge times of curves 41 and 42 are zero; at the midpoint of each cycle, twenty-one days, each curve has the maximum value of 70 minutes discharge time. The greatest difference between curves 41 and 42, in the vicinity of the break points between straight-line segments 43 and 44 and between straight-line segments 45 and 46, is not sufficiently great to cause improper operation of the system. If it is desired, however, to provide a more accurate straight-line synthesis of curve 41, discharge clock source 33 can be provided with more than two frequencies and a more complex logic circuitry within clock frequency control network 34 can be employed to selectively connect a larger number of different frequency determining circuits of discharge clock source 33 in circuit.

Initially, before starting the cycle, contact 19 is normally closed and counters 31 and 32 are manually reset to zero in synchronism with switch contact 10 being closed. Resetting of counters 31 and 32 is in response to a mechanical connection (not shown) between switch contact 10 and resetting circuitry (not shown) within each of the counters. Immediately after counters 31 and 32 are reset to zero, comparator 35 derives a short duration pulse on lead 24 to fire silicon controlled rectifier 21. In response to silicon controlled rectifier 21 being fired, relay coil 15 is energized to activate contact 14 so that charger 13 is connected in circuit with battery 11.

Substantially simultaneously with the closing of switch 10, a connection (not shown) is established between the clock motor of 24 hour clock source 16 and an a.c. supply. For the period between the initial connection of the clock motor within clock source 16 and the derivation of the first pulse from clock source 16 24 hours later, no further signals are applied to circuitry controlling contact 14. Accordingly, charger 13 is connected to battery 11 for the entire initial 24 hour period. It is to be noted that this initial 24 hour period is directed only to charging battery 11 and includes no discharge period. After the initial 24 hour period has elapsed, the first day of a 42 day cycle is considered to be initiated.

Twenty-four hours after initial closure of switch 10, clock source 16 derives a short duration pulse that is fed to counter 31 to advance the state of the counter from zero to one, thereby indicating the beginning of the first day in the 42 day cycle. Immediately after the count of counter 31 is advanced from zero to one, clock source 16 supplies a pulse to counter 32 to reset the counter to zero (in this case since counter 32 is already set to zero, it merely remains at zero). Simultaneously, clock source 16 supplies a pulse to coil 17 of relay 18, whereby contact 19 is open-circuited and relay coil 15 is deenergized. In response to relay coil 15 being deenergized, contact 14 returns to its normal condition so that battery 11 is discharged through load 12. Immediately after the pulse from clock source 16 has subsided, relay coil 17 is deenergized and contact 19 closes. Closure of contact 19, however, has no effect on energization of relay coil 15 because silicon controlled rectifier 21 has been previously extinguished in response to the short duration or momentary opening of contact 19. Silicon controlled rectifier 21 remains extinguished for 7.5 minutes to satisfy the requirements of FIG. 2 wherein it is indicated that the discharge time of battery 11 through load 12 for the first day is 7.5 minutes.

To provide the 7.5 minute discharge of battery 11 through load 12 during the first day of operation, clock source 33 is started by the same output pulse as the pulse which drives relay coil 17. After a time interval of 7.5 minutes from the opening of contact 19 in response to the output pulse of clock source 16, clock source 33 derives a pulse that is fed to discharge time counter 32. The time interval is 7.5 minutes since the clock frequency control network 34 in cooperation with counter 32 is feeding a binary zero level to clock source 33. The pulse fed to counter 32 by clock 33 advances the state of counter 32 from zero to one, the same count as is stored in counter 31. Comparator 35 responds to the equality of the count of counters 31 and 32 to derive on lead 24 an output pulse that fires silicon controlled rectifier 21. In response to firing of silicon controlled rectifier 21, relay coil 15 is again energized so that contact 14 connects charger 13 in circuit with battery 11 for the remainder of the first day. Thereby, the requirement of curve 42 of a 7.5 minute discharge time for the first day has been fulfilled.

At the beginning of the second day, a further pulse is derived by clock 16 to advance the state of counter 31 from one to two. Shortly thereafter, contact 19 is momentarily open-circuited, resulting in deactivation of relay coil 15 and which in turn positions contact 14 such that battery 11 discharges through load resistor 12. Discharge through load resistor 12 is designed to be for a period of 15 minutes, in accordance with curve 42.

Simultaneously with the momentary opening of contact 19, clock source 16 supplies a reset pulse to counter 32 to reset the discharge time counter to a zero state. At the same time, clock 33 is synchronized by the pulse output of clock source 16 so that clock 33 derives a first pulse 7.5 minutes after counter 32 is reset to zero. In response to the first pulse applied to counter 32 by clock source 33 after the counter was reset to zero, the state of the counter is advanced from zero to one. At this time, orbit counter 31 is storing a count of two so that no output signal is derived from comparator 35. After another 7.5 minute period has elapsed, however, clock 33 derives a further pulse to advance the count of counter 32 from one to two. Counters 31 and 32 now have identical counts, whereby comparator 35 derives on lead 24 an output pulse to trigger silicon controlled rectifier 21 into a conducting state. In response to silicon controlled rectifier 21 being activated to a conducting state, contact 14 is energized to connect battery 11 in circuit with charger 13. Thereby, at the beginning of a second day, battery 11 is connected with load resistor 12 for a time interval of 15 minutes and is connected with charger 13 for the remainder of the second day.

Operation continues in the manner stated with progressive increases of 7.5 minutes in the discharge time of battery 11 until the end of the eighth day of operation is reached to synthesize straight line 43, FIG. 2. At the end of the eighth day, the break point between lines 43 and 44 occurs so that thereafter it is necessary to apply pulses to counter 32 at a rate different from once every 7.5 minutes.

At the start of the ninth day of operation, clock source 16 increments orbit counter 31 so that the orbit counter 31 is loaded to a count of nine. Shortly after counter 31 is loaded to a count of nine, contact 19 is momentarily open-circuited in response to an output pulse of clock source 16 being applied to relay coil 17. This establishes a discharge path for battery 11. Simultaneously a pulse from clock source 16 acts to reset counter 32 to zero and synchronize discharge clock source 33. During the next 60 minutes, discharge clock source 33 supplies eight pulses, each having an interval between them of 7.5 minutes, to counter 32. In response to the count of eight now stored in counter 32, the logic circuitry included in clock frequency control network 34 changes state to feed a binary one level to clock source 33. The binary one level supplied by control network 34 to clock source 33 changes the frequency of the clock source 33 so that a pulse is derived thereby once every 0.77 minutes. Therefore, on the ninth day of operation, with counter 31 storing a count of nine, the ninth pulse applied to counter 32 is derived by clock source 33–60.77 minutes after counter 31 is driven to a count of nine by an output pulse of 24 hour clock source 16, i.e., the first eight pulses result in the 60 minute time interval (8 × 7.5 minutes = 60 minutes) and the ninth pulse results in the 0.77 minute time interval. In response to the resulting equality between the counts of counters 31 and 32, comparator 35 derives on lead 24 an output pulse which results in battery 11 being connected in circuit with charger 13, rather than in circuit with load 12. Thereby, during the ninth 24 hour period, battery 11 is connected in a discharge condition for 60.77 minutes and is in a charge condition the remainder of the time, as indicated by the straight line segment 44 of curve 42.

In response to the tenth pulse derived from clock source 16 similar operations occur, except that an output pulse is derived from comparator 35–61.54 minutes after the derivation of the pulse from clock source 16. This is because clock source 33 feeds eight pulses having an interpulse spacing of 7.5 minutes to counter 32 and two pulses having an interpulse spacing of 0.77 minutes to counter 32 before equality exists in the counter of counters 31 and 32. It is to be noted that the increment in the time comparator 35 derives a pulse on lead 24 for the ninth and tenth days is the same, being equal to 0.77 minutes.

Operation continues in the manner stated between the tenth and twenty-first days, when the peak discharge time of 70 minutes for battery 11 is reached. Thereby, during the interval between the end of the eighth and end of the twenty-first days, the discharge times of battery 11 are represented by straight-line segment 44.

The operation of relay contact 14 in response to the twenty-first pulse derived from clock source 16 is identical to the operation thereof in the interval between the ninth and twentieth pulses derived from clock source 16. Counter 31, however, responds to the twenty-first pulse from clock source 16 by reversing its counting direction, whereby further pulses applied thereto by clock source 16 cause the count of the counter to be decreased. This reversal is performed by logic network 30 included in counter 31. By decreasing the count of counter 31 in response to additional pulses from clock source 16, the symmetry of curve 42 is attained.

In response to the twenty-second pulse from clock source 16, counter 31 is activated so that it stores a count of 20. Accordingly, comparator 35 derives a pulse on lead 24 in response to 20 pulses being supplied by clock 33 to counter 32. Operation continues between the twenty-second and forty-second days along straight-line segments 45 and 46 in an identical manner to that described for the operations along straight-line segments 44 and 43 until the state of counter 31 is decreased from one to zero.

Batteries adapted to be mounted on artificial satellites in synchronous orbit are subjected to extended periods of continuous charge. To this end, in response to the count of counter 31 being decreased from one to zero, a signal is derived by logic circuitry (not shown) included in counter 31. The signal derived by the logic circuitry of counter 31 derives a signal that inhibits counter 31 from receiving further pulses from clock source 16. Simultaneously a pulse is supplied from comparator 35 to silicon controlled rectifier 21, thereby again establishing charging of battery 11 by battery charger 13. With counter 31 inhibited, further discharging of battery 11 is prevented so that the battery remains in its charged mode until counter 31 is reset so that it is no longer inhibited. It is to be understood, however, that if devices other than a switch connecting a battery with a charger and discharge circuit are responsive to the system illustrated by FIG. 1, or if it is desired to repetitively cycle the same battery through a number of 42 day cycles, the logic network within counter 31 responsive to the counter count being decreased from one to zero can be eliminated. The system can be used for life cycling battery 11 or for monitoring the battery condition during a 42 day cycle. In either event a voltage responsive chart recorder (not shown) can be connected across the terminals of battery 11 to provide a permanent record of the battery voltage as a function of time.

While there has been described and illustrated one specific embodiment of the invention, it will be clear that variations in the details of the embodiment specifically illustrated and described may be made without departing from the true spirit and scope of the invention as defined in the appended claims.

What is claimed is:

1. Apparatus for activating a device into first and second states comprising a source of periodic pulses occuring at a predetermined frequency, a first counter responsive to the periodic pulses and incremented by a count of one in response to each of said pulses, a second counter responsive to the periodic pulses and reset to a predetermined count in response to the derivation of each of the periodic pulses, means for incrementing the second counter with a periodicity much greater than the predetermined frequency, means responsive to the counts of the first and second counters for deriving an output response in response to a predetermined relationship between the counts of the first and second counters, and means responsive to the periodic pulses and the output response for activating the device into a first state once during each period between successive ones of the periodic pulses for a duration equal to the interval between the occurrence of a periodic pulse and the derivation of an output response and for activating the device into a second state for a duration equal to the remainder of the period between the successive periodic pulses.

2. The apparatus of claim 1 wherein said means for incrementing the second counter includes means for driving the second counter with plural different periodicities, and means responsive to a predetermined count of the second counter for controlling the periodicity with which the second counter is incremented.

3. The apparatus of claim 1 wherein said first counter includes means for enabling the count thereof to be selectively increased and decreased in response to attainment of a predetermined count therein, said count being advanced until attainment of said predetermined count and said count being decreased after attainment of said predetermined count.

4. Apparatus for activating a battery to simulate the charge and discharge characteristics of the battery while located on an artificial earth satellite comprising battery charger means for simulating the charging characteristics of the battery as if charged by a solar array illuminated by the sun, a load simulating the drain on the battery while the solar array is not illuminated by the sun, a source of periodic pulses having a predetermined frequency, a first counter responsive to the periodic pulses and incremented by a count of one in response to each of said pulses, a second counter responsive to the periodic pulses and reset to a predetermined count once in every period defined by a pair of successive ones of the periodic pulses, means for incrementing the second counter with a periodicity much greater than the periodicity of the periodic pulses, means responsive to the counts of the first and second counters for deriving an output response in response to a predetermined relationship existing between the counts of the first and second counters, and means responsive to the periodic pulses and the output response for connecting the battery with the load once during every period between successive ones of the periodic pulses for a duration equal to the interval between the occurrence of a periodic pulse and the derivation of an output response and for connecting the battery with the battery charger means for a duration equal to the remainder of the period between the successive periodic pulses.

5. The apparatus of claim 4 wherein said means for incrementing the second counter includes means for driving the second counter with a plurality of different periodicities, and means responsive to a predetermined count of the second counter for controlling the periodicity with which the second counter is incremented.

6. The apparatus of claim 4 wherein said first counter includes means for enabling the count thereof to be selectively increased and decreased in response to attainment of a predetermined count therein, said count being advanced until attainment of said predetermined count and said count being decreased after attainment of said predetermined count.

7. Apparatus for activating a battery to simulate the charge and discharge characteristics of the battery while located on a synchronous artificial earth satellite comprising battery charger means for simulating the charging characteristics of the battery as if charged by a solar array illuminated by the sun, a load simulating the drain on the battery while the solar array is not illuminated by the sun, a source of periodic pulses occurring once every 24 hours, a first counter responsive to the periodic pulses and incremented by a count of one in response to each of said pulses, a second counter responsive to the periodic pulses and reset to a predetermined count once every 24 hours in response to the derivation of each of the periodic pulses, means for incrementing the second counter with a periodicity much greater than once every 24 hours, means responsive to the counts of the first and second counters for deriving an output response in response to a predetermined relationship between the counts of the first and second counters, and means responsive to the periodic pulses and the output response for connecting the battery with the load during every 24 hour period for a duration equal to the interval between the occurrence of a periodic pulse and the derivation of an output response and for connecting the battery with the battery charger means during the remainder of the 24 hour period.

* * * * *